United States Patent
Mills

[11] Patent Number: 6,057,667
[45] Date of Patent: May 2, 2000

[54] BOOSTER WITH SWITCH ACTUATED CABLE DECOUPLER

[75] Inventor: Charles J Mills, Chicago, Ill.

[73] Assignee: Schumacher Electric Corporation, Mount Prospect, Ill.

[21] Appl. No.: 09/049,578

[22] Filed: Mar. 27, 1998

[51] Int. Cl.[7] .................................................. H02J 7/00
[52] U.S. Cl. ........................................ 320/105; 320/109
[58] Field of Search .................................... 320/105, 107

[56] References Cited

U.S. PATENT DOCUMENTS

| | | | |
|---|---|---|---|
| 2,659,042 | 11/1953 | Anderson et al. | 320/105 |
| 3,281,816 | 10/1966 | Raymond | 320/105 |
| 3,456,181 | 7/1969 | Godshalk | 320/105 |
| 4,667,141 | 5/1987 | Steele | 320/105 |
| 4,740,740 | 4/1988 | Taranto et al. | 320/105 |
| 4,769,586 | 9/1988 | Kazmierowicz | 320/105 |
| 4,902,955 | 2/1990 | Manis et al. | 320/105 |

*Primary Examiner*—Peter S. Wong
*Assistant Examiner*—Pia Tibbits
*Attorney, Agent, or Firm*—Richard A. Zachar

[57] ABSTRACT

A booster apparatus is provided for applying electrical power to a device in which a power source having positive and negative terminals is disposed in a housing, with electrical cables extending from respective positive and negative or grounded terminals to exterior of the housing, with an electrical switch interposed in one of said electrical cables interior of the housing manually actuable from outside of the housing, with an electrical circuit operatively coupled to one of the cables and the electrical switch, whereby the electrical circuit effects automatic closing of an electrical switch upon imposition of a predetermined minimum voltage to the cables, and effects opening of the electrical switch upon the second cable having a voltage less than the predetermined minimum voltage, and with a voltage comparator and its associated circuitry to indicate a level of charge for the power source. Hence, the portion of the cables extending exteriorly of the housing are not live unless and until connected with a device having a voltage greater than a predetermined voltage, such as provided by a depleted automobile battery.

7 Claims, 1 Drawing Sheet

BOOSTER WITH SWITCH ACTUATED CABLE DECOUPLER

FIELD OF THE INVENTION

The present invention pertains to booster apparatus, and more particularly pertains to booster apparatus used to recharge a depleted automobile battery.

BACKGROUND OF THE INVENTION

Internal combustion automobile engines typically require a separate electric motor, or starter, to externally rotate the engine crankshaft at a sufficiently rapid rate to start the engine. The starter is electrically powered by an automobile battery. It is important that the automobile battery have sufficient power to rotate the starter fast enough that it effects starting of the engine. However, occasionally an automobile battery may inadvertently become partially depleted or discharged, such as due to the lights or radio of the automobile being left on without the car running. Typical automobile batteries have a voltage potential of approximately 12V. While even depleted automobile batteries retain a potential of greater than 10V, this depleted battery charge may be insufficient to drive the starter with enough electrical power to crank the engine, resulting in the inability to start the engine. Accordingly, it is known to electrically connect a separate booster battery to the automobile battery to provide the requisite 12V potential for starting the engine. The booster battery is connected in parallel to the depleted automobile battery through electrical cables in order to recharge or bypass the depleted automobile battery. This is commonly referred to as "jump starting" the depleted automobile battery.

Typically, a pair of electrical cables commonly referred to as "jumper cables" are employed which have clamps adjacent either end of each cable. The clamps at either end of one cable are connected to respective negative terminals of the automobile battery and booster battery, and the clamps at either end of the other cable are connected to respective positive terminals of the automobile battery and booster battery. This requires that four separate electrical connections be made, and if any one or more of the connections is made poorly or improperly, it may result in short circuiting and/or failure to start the engine. Additionally, after one end of a cable is clamped to its respective battery terminal, the cable, including the clamp at the other end of the cable, is live, and hence great care must be exercised in handling of the live cable and clamp, and in preventing contact between the positive and negative cables.

Some manufacturers have combined the booster battery and cables in one unit, with one end of each of a pair of cables permanently connected to respective positive and negative terminals of the booster battery. A particular problem associated with this structure is that cables which are permanently connected to the battery are always live. Hence, care must be exercised at all times in the handling of the clamps. Clamp shielding structures, such as holsters molded on the housing in which the clamps are receivable to shield the clamps from one another, and from contact with persons during transporting of the booster battery, have been employed. However, this does not provide any protection to users with regard to exposure of the clamps having live voltage during usage of the booster battery, i.e. during the time the clamps are removed from their holsters and connected to the automobile battery, as well as during the time the clamps are subsequently removed from the automobile battery and returned to their holsters. Accordingly, there remains a need for a booster battery which overcomes the aforementioned problems associated with handling live clamps during jump starting of an automobile engine.

SUMMARY OF THE INVENTION

In accordance with the present invention, a booster battery or apparatus is provided which overcomes the aforementioned shortcomings of prior art booster batteries. In accordance with one aspect of the present invention, in a booster apparatus which includes a battery having positive and negative terminals, a housing encasing the battery, and a pair of booster cables for lining the terminals with the device, the booster apparatus is provided with the improvement of an electrical switch manually actuatable from the exterior of the housing for selectively coupling and decoupling one of the cables, from the positive of the terminals, at a location interior of the housing.

In accordance with another aspect of the present invention, a booster apparatus is provided for applying electrical power to a device, in which the apparatus comprises a battery having a positive terminal and a negative terminal, an electrical switch having a first contact and a second contact, which is operable between a closed position in which the first and second contacts are electrically coupled, and an open position in which the first and second contacts are decoupled, with a first cable extending between one of the battery terminals and the first switch contact, and with a second cable connected to the second switch contact, and an electrical circuit operatively coupled to the second cable and the electrical switch, with the electrical circuit effecting automatic closing of the electrical switch upon imposition of a predetermined minimum voltage to the second cable, and effecting opening of the electrical switch upon the second cable having a voltage less than the predetermined minimum voltage.

BRIEF DESCRIPTION OF THE DRAWING

In the drawing, wherein like elements are referenced alike.

DETAILED DESCRIPTION OF THE PREFERRED EMBODIMENT(S)

Figure 1:
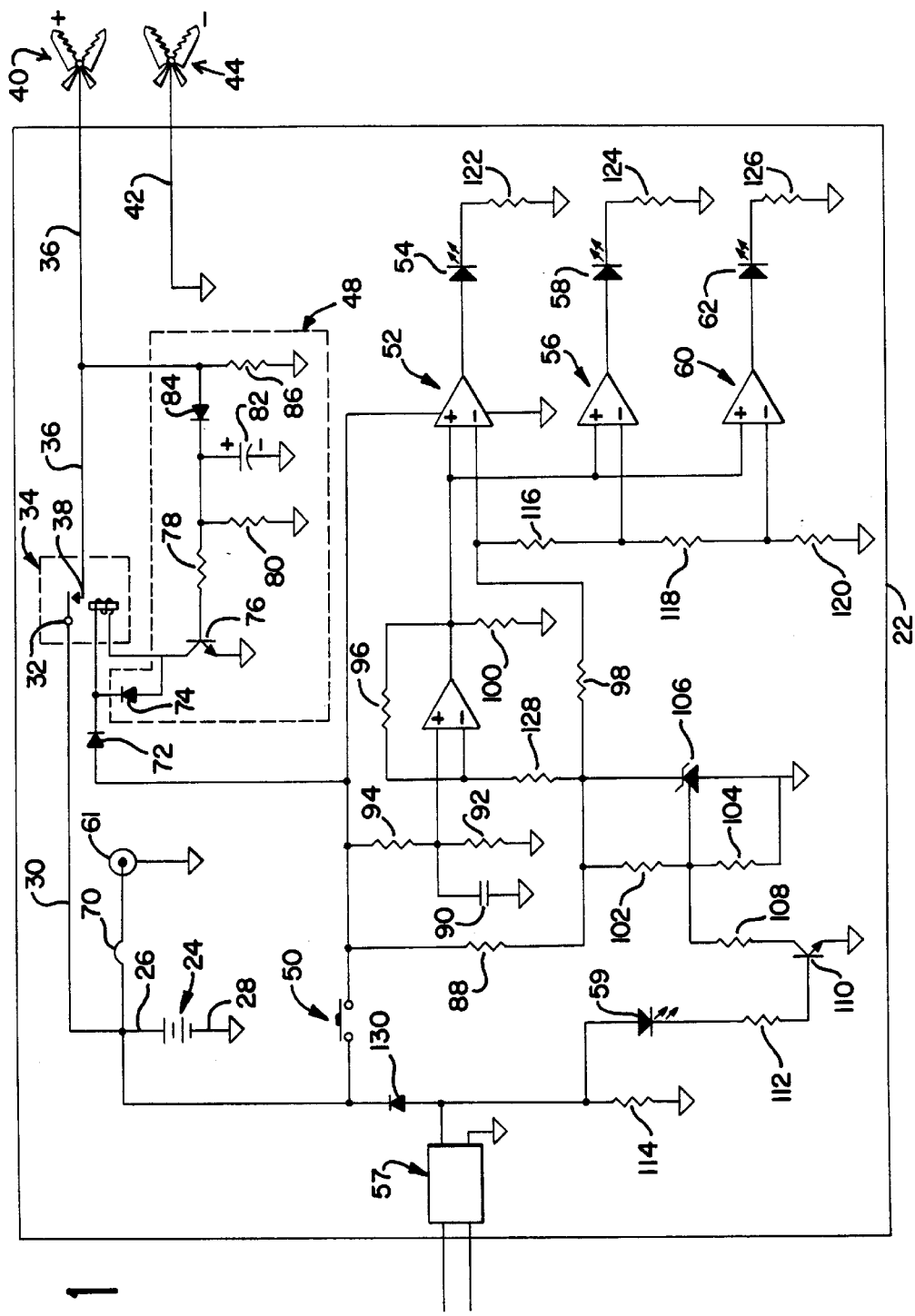
FIG. 1 is a diagram of a booster battery or booster apparatus embodying various features of the present invention.

A booster battery or booster apparatus embodying various features of the present invention is illustrated in FIG. 1 and referred to generally by reference numeral 20. The booster apparatus 20 has a housing 22, which is preferably formed of a non-conductive material. A battery or other electrical power source 24 is disposed in the housing 22 and has positive and negative (or ground) terminals 26 and 28, respectively, which are also disposed within the housing. A first positive wire or length of cable 30 extends from the positive terminal 26 to a first contact 32 of an electrical switch 34. A second positive wire or length of cable 36 extends from a second contact 38 of the electrical switch 34, and extends externally of the housing 22. The electrical switch 34 is operable between an open position in which the first and second contacts 32 and 38 are out of electrical contact with one another so that no current flows across the switch 34, and a closed position in which the first and second contacts 32 and 38 are in electrical contact with one another, so that current flows across the switch 34.

A clamping jaw 40 may be provided at the free end of the cable 36 for securely electrically coupling the cable 36 with a positive terminal of a depleted battery, such as a depleted automobile battery for jump starting an automobile engine.

The negative or ground terminal 28 is grounded to ground voltage, and a ground wire or length of cable 42 extends from the ground or the negative terminal and extends externally of the housing 22. A clamping jaw 44 may be provided at the free end of the cable 42 for securely electrically coupling the cable 42 with a negative terminal of a deleted battery or to ground, such as the negative terminal of a depleted automobile battery or the engine block of an automobile engine.

In accordance with a particularly advantageous feature of the present invention, the booster battery or booster apparatus 20 has an applied voltage sensor 48 operatively connected with the second positive cable 36, which applied voltage sensor 48 senses the voltage applied to the second positive cable 36, and generates a switching signal when the voltage applied to the second positive cable 36 exceeds a predetermined voltage. The electrical switch 34 is operatively connected with the applied voltage sensor 48 such that it receives the switching signals from the applied voltage sensor 48. The electrical switch 34 automatically closes upon its receipt of the switching signal, whereupon the second positive cable 36 and associated clamping jaw 40 have the voltage of the positive terminal 26 of the power source, and hence become live.

That is, prior to the clamps 40 and 44 being placed into electrical contact with a voltage source of greater voltage than some predetermined voltage, i.e. until a voltage of greater than the predetermine voltage is applied to the positive clamp 40, the electrical switch 34 remains open and no electrical power is present at the clamps 40 and 44. However, upon the voltage applied to the positive clamp 40 exceeding the predetermined voltage, e.g. when the clamps 40 and 44 are connected to the positive and ground or negative of a depleted automobile battery having a remaining potential greater than the predetermined voltage, the electrical switch 34 is automatically closed, and the power of the power source 24 is then present at the clamp 40. This provides a significant improvement in the ease of handling of the cables and clamps of the booster apparatus as compared to prior art boosters in which the cables and clamps remain live at all times.

It is preferred that the predetermined minimum voltage be low enough that a typical depleted automobile battery, such as one which has been used in an auto whose lights have ben left on overnight, will still have a voltage greater than the predetermined minimum voltage. It has been found that employing circuitry suitable for providing a predetermined minimum voltage of approximately 2 volts has provided good results.

The power source 24 is preferably a rechargeable power source. The booster apparatus 20 preferably has an AC/DC adaptor 57 operatively connected with the power source, for receiving a 120 volt AC power supply and converting it to a 12 volt DC, 0.5 amp output which is fed to the rechargeable power source 24 to recharge the power source 24. A "charging" light emitting diode 59 is operatively coupled with the adaptor 57 to illuminate the diode 59 when the adaptor 57 is energized from an external power source and is recharging the power source 24, to provide a positive indication to the user that the power source is, indeed, being recharged.

The booster apparatus also preferably has a cigarette lighter-type receptacle 61 operatively connected to the power source 24 through a circuit breaker 70 whereby 12 volt DC power is supplied to the receptacle 61 for driving external devices.

The booster apparatus or booster battery 20 also preferably includes voltage comparator circuitry operatively coupled with the power source 24 and with means for indicating the potential of the power source 24, such as light emitting diodes. In the illustrated embodiment, the voltage comparator circuitry is only actuated upon and subsequent to closing of the switch 50, as discussed further below. A first voltage comparator circuitry, indicated generally by reference numeral 52, which is operatively coupled with light emitting diode 54, lights the diode 54 when the potential of the power source 24 is at or greater than a predetermined "ready" voltage, which ready voltage is sufficient to jump start a typical automobile engine. A second voltage comparator circuitry, indicated generally by reference numeral 56, which is operatively coupled with light emitting diode 58, lights the diode 58 when the potential of the power source 24 is at or greater than a predetermined "partial" charge voltage, which partial charge voltage is intermediate of the "charging" voltage and a "recharge" voltage described below, such as approximately 75% of full charge. The partial charge light emitting diode 58 gives the user an indication of the potential of the power source 24 to provide some indication of the amount of charging of the power source 24 necessary to bring it to the charging voltage. Finally, a third voltage comparator circuitry, indicated generally by reference numeral 60, which is operatively coupled with the light emitting diode 62, lights the diode 62 when the potential of the power source 24 is below a predetermined "recharge" voltage which is so low as to require recharging of the power source 24, such as less than 50% of full charge.

The booster apparatus 20 of the preferred and illustrated embodiment will now be described more specifically with reference to the following table.

| Reference Numeral | Component | Description |
| --- | --- | --- |
| 70 | circuit breaker | CD2A12OD |
| 72 | diode | 1N4001 |
| 74 | diode | 1N4001 |
| 76 | transistor | 2SD882P or 2SD882Y |
| 78 | resistor | 1K ohms ¼ watt |
| 80 | resistor | 10K ohms ¼ watt |
| 82 | capacitor | 4.7 µF |
| 84 | diode | 1N4001 |
| 86 | resistor | 390 ohms ½ watt |
| 88 | resistor | 1K ohms ¼ watt |
| 90 | capacitor | 0.1 µF |
| 92 | resistor | 100K ohms ¼ watt |
| 94 | resistor | 200K ohms ¼ watt |
| 96 | resistor | 150K ohms ¼ watt |
| 98 | resistor | 3.24K ohms ¼ watt 1% |
| 100 | resistor | 10K ohms ¼ watt |
| 102 | resistor | 2.7K ohms ¼ watt |
| 104 | resistor | 2.7K ohms ¼ watt |
| 106 | IC2 Regulator | TL431CLP |
| 108 | resistor | 20K ohms ¼ watt |
| 110 | transistor | 9014 |
| 112 | resistor | 3.3K ohms ¼ watt |
| 114 | resistor | 2K ohms ¼ watt |
| 116 | resistor | 500 ohms ¼ watt |
| 118 | resistor | 0 ohms ¼ watt |
| 120 | resistor | 2.7K ohms ¼ watt |
| 122 | resistor | 2K ohms ¼ watt |
| 124 | resistor | 2K ohms ¼ watt |
| 126 | resistor | 2K ohms ¼ watt |
| 128 | resistor | 100K ohms ¼ watt |
| 130 | diode | 1N5400 |

While the invention is described by way of example, with reference to certain elements being specifically connected with positive and negative terminals, it will be readily apparent to those skilled in the art that the invention may be carried out or embodied in a device in which the positive and negative terminals and/or connections are reversed, i.e. in a positively grounded system. Furthermore, although the invention is set forth herein by way of illustrated and preferred embodiments, the invention is not limited in this regard, and many modifications and variations will be apparent to those skilled in the art, and the invention covers all such structures falling within the scope and spirit of the invention as set forth in the accompanying claims.

What is claimed is:

1. In a booster apparatus for applying electrical power to a device wherein said apparatus includes a power source having positive and negative terminals, a housing encasing said power source, and a pair of booster cables for linking said terminals with said device, the improvement comprising an electrical switch manually actuatable from the exterior of said housing for selectively coupling and decoupling one of said cables, from the positive of said terminals, at a location interior of said housing, and a voltage comparator operatively coupled with said power source for indicating a characteristic of a potential of the power source.

2. In a booster apparatus in accordance with claim 1, the apparatus further comprising a voltage sensor for decoupling one of said cables from the positive of said terminals in the absence of a voltage greater than a predetermined voltage applied to said one of said cables, and coupling said one of said cables to the positive of said terminals upon the application of a voltage greater than said predetermined voltage to said one of said cables.

3. A booster apparatus for applying electrical power to a device, the apparatus comprising:

a power source having a positive terminal and a negative terminal;

an electrical switch having a first contact and a second contact, and operable between a closed position in which the first and second contacts are electrically coupled, and an open position in which the first and second contacts are electrically decoupled;

one of the power source terminals electrically connected to the first switch contact;

a cable electrically connected to said second contact and extending to an exterior of a housing; and an electrical circuit operatively coupled to said cable and said electrical switch, said electrical circuit effecting automatic closing of said electrical switch upon imposition of a predetermined minimum voltage to said cable, and effecting opening of said electrical switch upon said cable having a voltage less than said predetermined minimum voltage, an electrical connection from one of the power source terminals to said electrical circuit having a second electrical switch interposed in said electrical connection between said power source terminal and said electrical circuit for selectively coupling and decoupling said electrical circuit from said power source terminal, said power source and said first and second electrical switches being disposed in a housing, said second electrical switch being manually actuatable from the exterior of the housing, and a voltage comparator circuitry electrically coupled with said power source for indicating a level of charge of the power source.

4. A booster apparatus in accordance with claim 3 in which said electrical switch comprises a solenoid.

5. A booster apparatus having a housing and a power source with positive and negative terminals disposed within the housing, and with a positive cable extending from said positive terminal to exterior of the housing, and a negative cable extending from one of said negative terminal and ground to exterior of the housing, the booster apparatus comprising:

a voltage sensor operatively connected with said positive cable for sensing the voltage applied to said positive cable and generating a switching signal when said voltage applied to the positive cable exceeds a predetermined voltage;

a switch interposed in said positive cable at a location interior of said housing, said switch being operable between an open position in which current does not flow across the switch and a closed position in which current flows across the switch, the switch being operatively connected with said applied voltage sensor for receiving said switching signal, with the switch closing in response to receipt of said switching signal to allow current to flow across the switch to the portion of the positive cable exterior of the housing, and the switch being in its open position in the absence of said switching signal to prevent a flow of current to the portion of the positive cable exterior of the housing, and a voltage comparator circuitry electrically coupled with said power source for indicating a level of charge of the power source.

6. A booster apparatus in accordance with claim 5 in which said predetermined voltage is approximately 2 volts.

7. A booster apparatus in accordance with claim 5 in which said switch comprises a solenoid.

* * * * *